United States Patent
Biglino

(10) Patent No.: US 6,676,153 B2
(45) Date of Patent: Jan. 13, 2004

(54) EASILY INSTALLED SIDE CURTAIN AIRBAG MODULE

(75) Inventor: Stefano Biglino, Turin (IT)

(73) Assignee: Breed Automotive Technology, Inc., Lakeland, FL (US)

( * ) Notice: Subject to any disclaimer, the term of this patent is extended or adjusted under 35 U.S.C. 154(b) by 28 days.

(21) Appl. No.: 10/146,939

(22) Filed: May 17, 2002

(65) Prior Publication Data

US 2003/0090090 A1 May 15, 2003

(30) Foreign Application Priority Data

Nov. 9, 2001 (IT) .................................. MI2001 A 2355

(51) Int. Cl.[7] ............................ B60R 21/16; B60R 21/22
(52) U.S. Cl. ................................ 280/728.2; 280/730.1; 403/317
(58) Field of Search ........................... 280/728.2, 728.1, 280/730.1, 730.2, 743.1, 742.2; 403/315–317, 321, 322.1, 325, 345; 24/612, 613

(56) References Cited

U.S. PATENT DOCUMENTS

| | | | | |
|---|---|---|---|---|
| 5,738,369 A | * | 4/1998 | Durrani | 280/731 |
| 5,890,733 A | * | 4/1999 | Dillon | 280/730.2 |
| 6,102,434 A | * | 8/2000 | Ohlert et al. | 280/728.2 |
| 6,173,988 B1 | * | 1/2001 | Igawa | 280/728.2 |
| 6,264,232 B1 | * | 7/2001 | Clark | 280/728.2 |
| 6,457,744 B1 | * | 10/2002 | Tonooka | 280/732 |

* cited by examiner

Primary Examiner—Son T. Nguyen
(74) Attorney, Agent, or Firm—Jarett Rieger

(57) ABSTRACT

An airbag device for side protection in a motor vehicle has an inflatable airbag and a plurality of attachment elements that are anchored to the airbag module and can be inserted into a corresponding plurality of slots in a structural member of a motor vehicle in an assembly direction that is substantially parallel to a surface of the structural member of the vehicle having the slots therein. The attachment element is provided with engagement elements that extend along at least part of the edges of the slots and locking elements that hold the attachment elements in a position to engage the structural member of the motor vehicle.

8 Claims, 3 Drawing Sheets

EASILY INSTALLED SIDE CURTAIN AIRBAG MODULE

FIELD OF THE INVENTION

The present invention relates to a side curtain airbag module.

BACKGROUND OF THE INVENTION

Airbag modules for side impacts, also knows as CAB or Curtain Airbags comprise at least one folded inflatable airbag provided with a means for assembly on a casing, which is a structural member of the motor vehicle and contained in a covering that keeps the airbag folded until the time of use. The airbag generally extends along the length of the passenger compartment of the motor vehicle and is attached to a structural member of the motor vehicle above the windows, on the roof panel. In a crash the airbag inflates downwards to protect vehicle occupants from impact against the structure and windows of the motor vehicle and from contact with any slivers of glass.

A commonly used system for attaching an airbag module to a structural member of the motor vehicle comprises a nut and a bolt. This installation system attaches the airbag module firmly to the structural member of the motor vehicle, but has high production and assembly costs due to the time required for these operations.

SUMMARY OF THE INVENTION

There is provided in accordance with the present invention an airbag module comprising: an inflatable airbag and a plurality of attachment elements that are anchored to said airbag module and can be inserted into a corresponding plurality of slots in a structural member of a motor vehicle in an assembly direction that is substantially parallel to a surface of the structural member of the vehicle having the slots therein, said attachment elements being provided with engagement means that extend along at least part of the edges of said slots and means for locking said attachment elements in a position to engage said structural member of the motor vehicle.

DETAILED DESCRIPTION OF THE INVENTION

Figure 1:
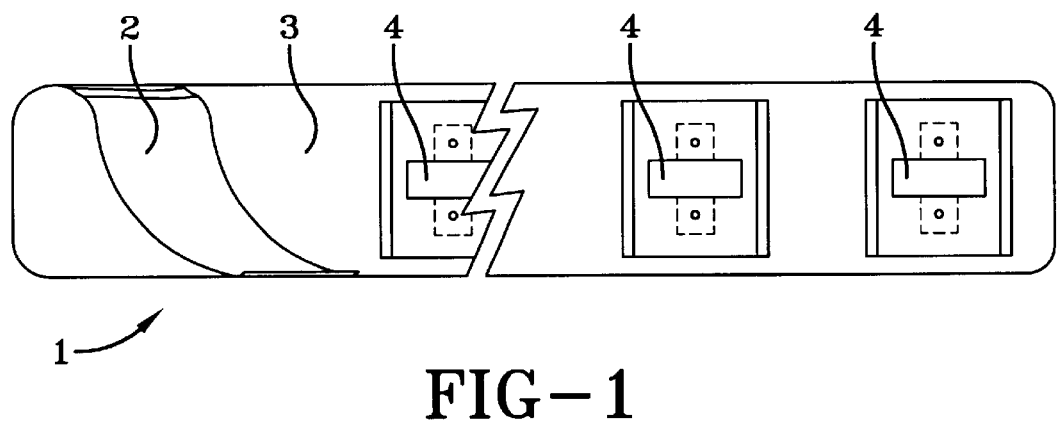
FIG. 1 is a schematic side view, partially broken away to reveal interior components, of an airbag module according to the invention.
Figure 2:
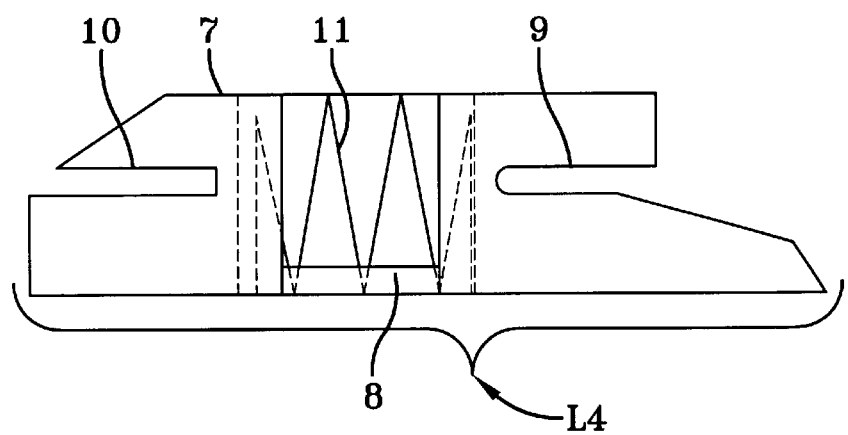
FIG. 2 is a side view of an attachment element of the airbag module of FIG. 1.
Figure 3:
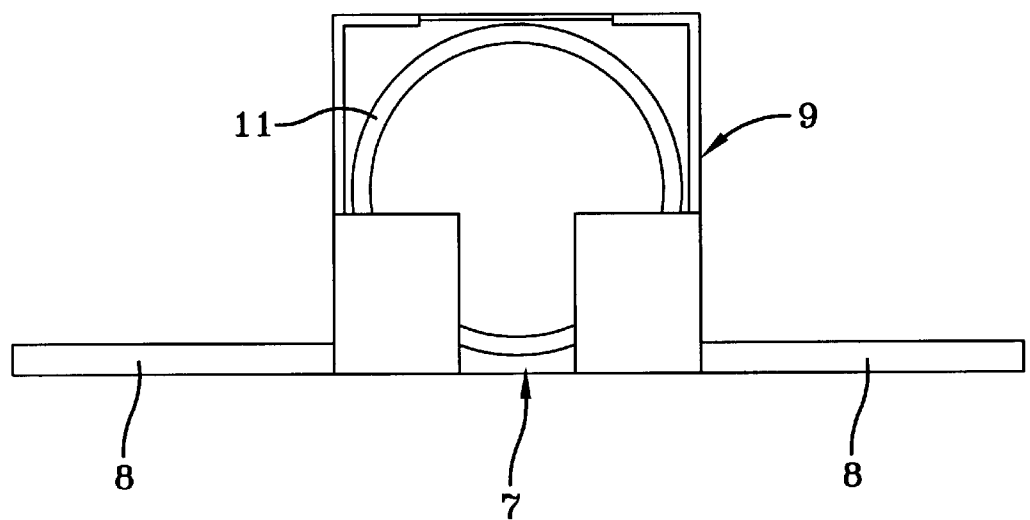
FIG. 3 is a cross-section of the airbag module of FIG. 1.
Figure 4:
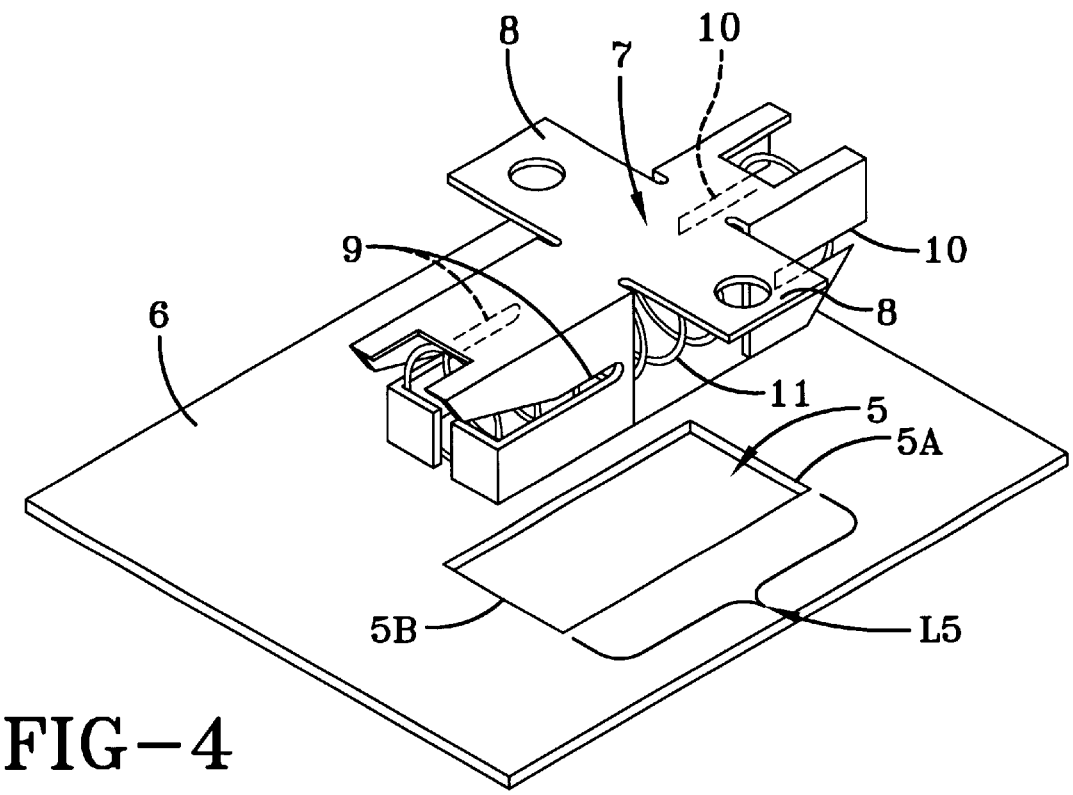
FIG. 4 is a perspective schematic view of the attachment element adjacent an assembly slot in a structural member of a motor vehicle.
Figure 5:
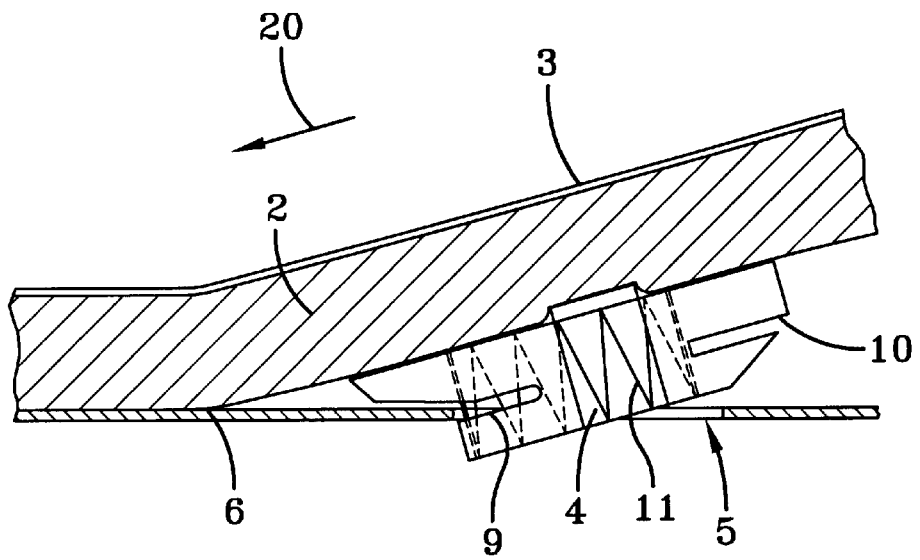
FIGS. 5–7 are sectional views of the airbag module during assembly.
Figure 6:
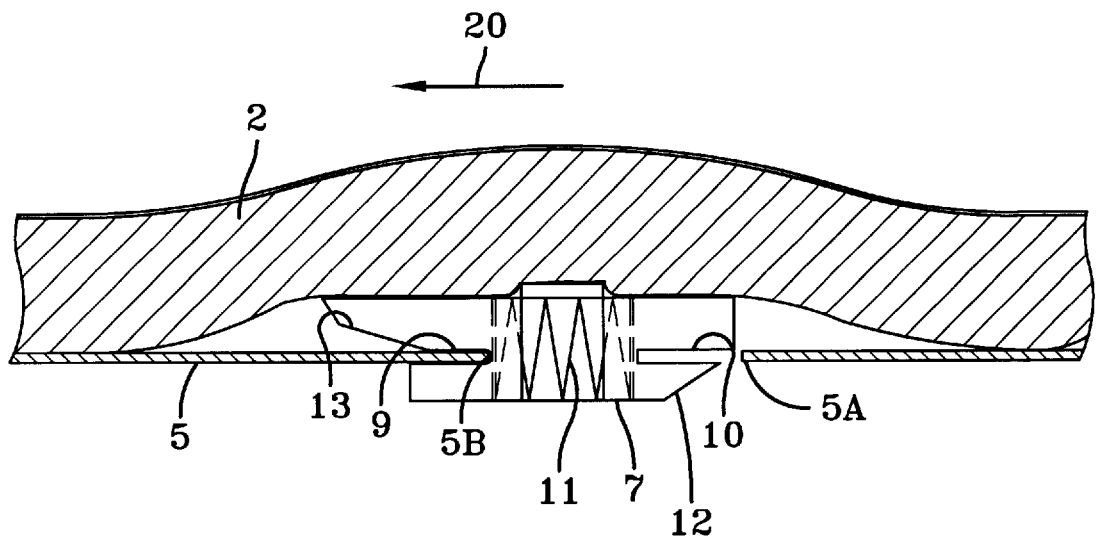
Figure 7:
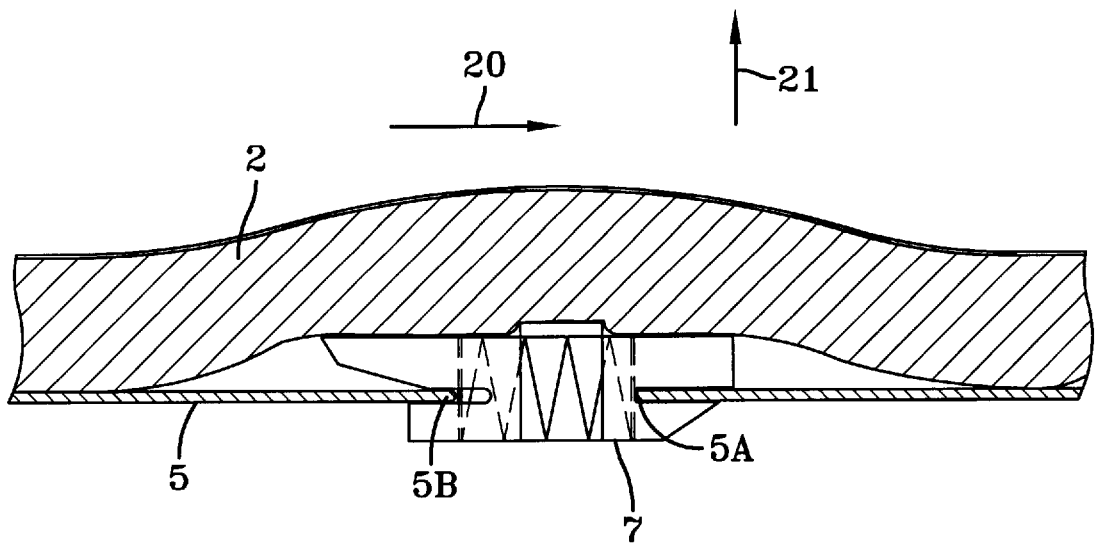

FIG. 1 is a schematic side view, partially broken away to reveal interior components, of an airbag module according to the invention. A side curtain airbag module 1 comprises an inflatable airbag 2 that is normally deflated, folded and housed in a container bag 3. Anchored to the airbag, directly or indirectly, are a plurality of means 4 for attaching the airbag module to a structural member of the motor vehicle of the motor vehicle, such as a roof rail. According to the invention, the means for attachment 4 cooperate with a corresponding plurality of slots 5, as shown in FIG. 4, in the sheet metal 6 of a structural member of the motor vehicle and can be inserted into said slots to engage the slots in an assembly direction that is substantially parallel to the surface of the structural member of the vehicle having the slots therein, as shown in FIGS. 5–7. The direction of insertion is indicated by the arrow 20 in FIGS. 5–7 and from these it can be seen that, as better described hereunder, as the length of the attachment element 4 is greater than the length of the slot, the assembly direction is initially slightly at an angle and then, as shown in FIG. 7, parallel to the surface of the structural member of the vehicle having the slot 5 therein, this slight angulation and subsequent parallelism have been defined with the term "substantially parallel".

The attachment elements 4 are provided with means for engaging the structural member of the motor vehicle that extend along at least part of the edges of the slot 5 and means for locking that hold said attachment elements in a position of engagement with the structural member of the motor vehicle.

The means for engaging the edges of the slot extend along at least the opposite side of the sheet metal 6 from the airbag 2, although, preferably, the attachment elements 4 are produced so as to engage the edges of the slot on both sides of the sheet metal 6. For this purpose the attachment elements 4 have a box-shaped casing 7 with a pair of tabs 8 for attaching the attachment element to the inflatable airbag 2 and means for locking the attachment element 4 in an engaged position in the slot. The tabs 8 for attaching the attachment element to the airbag are made in one piece with the box-shaped casing, obtained from a piece of cut and folded sheet metal The casing 7 may also preferably be made of a plastic material with rounded edges to avoid the risk of perforating the inflated airbag.

The means for locking the attachment element 4 in position comprise a spring 11 or an equivalent elastic member, such as a tongue, that is compressed during the phase to insert the attachment element 4 into the slot 5 and normally pushes the box-shaped casing 7 against the structural member of the motor vehicle, that is against the edges of the slot 5, in the assembly direction that is parallel to the surface of the structural member of the vehicle having the slot therein. The spring 11 is housed in the casing 7 and works in compression.

In the preferred embodiment shown in the drawings, the box-shaped casing 7 has two pairs of indentations 9, 10 arranged on transversally opposite sides of said casing; these indentations have the function of engaging the sheet metal 6 of the structural member of the motor vehicle at the edges 5A and 5B of the slot 5, on both sides of the sheet metal.

In particular, the indentations 9, 10 have different lengths, with the indentations 10 being shorter than the indentations 9. The function of the indentations will be explained hereunder with reference to FIGS. 5–7.

The length L4 of the attachment elements 4 is greater than the length L5 of the slot 5 to provide the necessary resistance of the airbag module to stresses deriving from inflation of the airbag. The indentations have the function of allowing insertion of the attachment elements 4 into the slot and guaranteeing resistance of the attachment elements once they are inserted. Insertion initially contemplates engagement of the edge 5B of the slot with the indentations 9, as shown in FIG. 5, to take the edge of the slot substantially to the end of the indentations 9 and to insert the attachment element 4 into the slot, as shown in FIG. 6, and finally to engage the opposite edge 5A of the slot with the indentations 10. The spring 11, or similar elastic member, is initially compressed; when the indentations 10 are engaged by the edge 5A of the slot the spring 11 will stress the casing 7 towards said edge 5A to take the edge 5A to the end of its travel that is to the end of the indentations 10. In this way the condition shown in FIG. 7 is obtained, making it possible to prevent the attachment element 4 from slipping out of the slot even if stressed following actuation of the airbag module and inflation of the airbag. With this solution, further advantages are obtained, such as the lack of noise caused by vibrations of the vehicle and reversible assembly of the airbag module on the structural member of the motor vehicle.

In FIG. 7 an arrow 21 indicates the direction of stress by the airbag during its inflation; as can be seen, the assembly direction indicated by arrow 20 of said airbag modules is substantially perpendicular to the direction in which said attachment elements are stressed during and/or after inflation of the airbag. In any case, the attachment elements 4 are assembled so that the stress indicated by the arrow 21 will be directed towards the pair of indentations 10 with the shorter length, so as to avoid any possible slipping of the attachment elements 4 out of the slot 5.

To facilitate insertion into the slot there are sloping parts 12 at the indentations 10 and further sloping parts 13 at the indentations 9.

The present invention provides a side curtain airbag having a means for attachment that is inexpensive to produce, quick to assemble and provides the necessary resistance of the airbag module to stresses occurring during deployment of the airbag.

The invention has numerous advantages in relation to prior art. Thanks to the layout of the attachment elements it is possible to reduce operations on the structural member of the motor vehicle to the mere production of a series of slots in which the attachment elements are inserted. Moreover, these attachment elements are held in position by the aforesaid elastic member and the assembly operation is thus extremely quick and simple. Another advantage is that the attachment elements are inserted into the corresponding slot and engage this in a direction parallel to the surface of the structural member of the motor vehicle on which the slot is made: In this way stresses during use of airbag are substantially perpendicular to the airbag module and are discharged to the entire casing of this through the aforesaid indentations.

Many changes and modification in the above described embodiment of the invention can, of course, be carried out without departing from the scope thereof. Accordingly, that scope is intended to be limited only by the scope of the appended claims.

I claim:

1. An airbag module comprising:
   an inflatable airbag and
   a plurality of attachment elements that are anchored to said airbag module and can be inserted into a corresponding plurality of slots in a structural member of a motor vehicle in an assembly direction that is substantially parallel to a surface of the structural member of the vehicle having the slots therein, said attachment elements comprising:
      a box-shaped casing attached to the inflatable airbag, the box-shaped casing has an indentation formed therein on one side and another indentation formed therein on the other side, the indentations engage both sides of the structural member of the motor vehicle on said edges of the slots, and
      an elastic member for locking said attachment elements in a position to engage said structural member of the motor vehicle wherein the elastic member applies stress to the box-shaped casing in a direction that is parallel to the surface of the structural member.

2. The airbag module as claimed in claim 1, in which the assembly direction is substantially perpendicular to the direction in which said attachment elements are stressed after inflation of the airbag.

3. The airbag module according to claim 1 wherein the box-shaped casing has a pair of indentations formed therein on one side and another pair of indentation formed therein on the other side.

4. The airbag module as claimed in claim 3, wherein one of said pairs of indentations is shorter in length than the other pair.

5. The airbag module as claimed in claim 4 wherein said elastic member pushes the pair of indentations shorter in length against said edges of the structural member of the motor vehicle.

6. The airbag module according to claim 3 wherein the airbag module is secured to the structural member exclusively by the engagement of the two pairs of indentations with the edges of the slots.

7. The airbag module according to claim 3 wherein the indentations are disposed in approximately the middle of the box-shaped casing relative to a top and bottom portion of the box-shaped casing.

8. The airbag module according to claim 3 wherein the elastic member is partly disposed between the two pairs of indentations wherein compression of the elastic member diminishes the distance between the two pairs of indentations.

* * * * *